Figure 1:
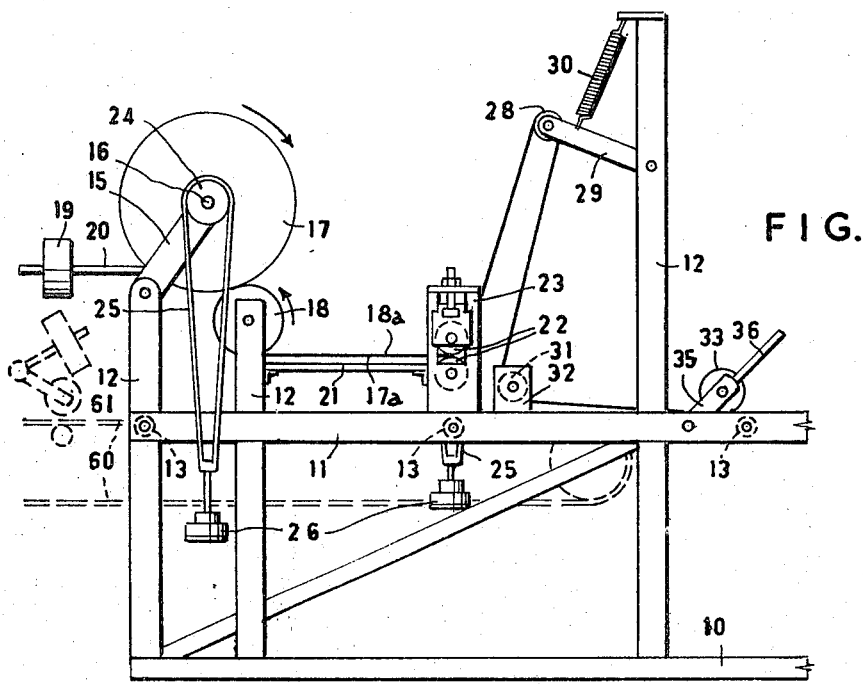

United States Patent [19]

Menzies et al.

[11] 3,720,558
[45] March 13, 1973

[54] HEAT-INSULATING PANEL OR SHEET AND A METHOD OF AND APPARATUS FOR MAKING THE SAME

[75] Inventors: John Ian Menzies; Maureen Menzies, Kenmore, Brisbane, Queensland, Australia

[73] Assignee: Heatshield Research and Development Pty. Ltd., Brisbane, Queensland, Australia

[22] Filed: June 16, 1969

[21] Appl. No.: 834,241

[52] U.S. Cl. ............156/199, 156/200, 156/201, 156/202, 156/205, 156/222, 156/267, 156/269, 156/309, 156/324, 156/461, 156/462, 156/471, 156/472, 156/594

[51] Int. Cl. ..........B31f 1/20, B31f 1/28, B32b 31/20

[58] Field of Search......156/182, 200, 201, 210, 233, 156/235, 324, 199, 269, 301, 306, 309, 202, 205, 207, 222, 223, 267, 269, 270, 271, 461, 462, 464, 467, 470, 471, 472, 473, 483, 484, 485, 594

[56] References Cited

UNITED STATES PATENTS

| 3,245,121 | 4/1966 | Graff | 156/594 X |
| 3,425,888 | 2/1969 | Kellicutt | 156/594 X |
| 2,482,981 | 9/1949 | Kamrass | 156/269 X |
| 3,006,113 | 10/1961 | Barnes et al. | 156/182 X |
| 3,446,208 | 5/1969 | Fukuda | 156/210 X |
| 3,526,000 | 8/1970 | Williams | 156/306 X |

FOREIGN PATENTS OR APPLICATIONS

| 805,320 | 3/1957 | Great Britain | 156/210 |
| 946,439 | 6/1961 | Great Britain | 156/210 |
| 220,274 | 9/1956 | Australia | 156/269 |

*Primary Examiner*—Carl D. Quarforth
*Assistant Examiner*—Roger S. Gaither
*Attorney*—Oberlin, Maky, Donnelly & Renner

[57] ABSTRACT

A panel or sheet is insulated against heat from a heat source by a metal foil lamination bonded to, and separated from direct contact with, the surface of the panel or sheet remote from the heat source by an interposed lamination of transparent thermoplastic material, the bonding being effected by the application of heat and pressure.

5 Claims, 7 Drawing Figures

HEAT-INSULATING PANEL OR SHEET AND A METHOD OF AND APPARATUS FOR MAKING THE SAME

This invention relates to improved heat insulating panel or sheet and a method of and apparatus for making the same.

Sheet materials used for roofs, such as corrugated galvanized sheet steel and corrugated asbestos cement, though economical to make, transport and erect, are generally not good insulators against solar heat, and although roofs made of such materials may be additionally heat-insulated, this has hitherto been costly.

The main objects of the invention are to provide articles, including such roofing materials, but also including tiles, wall cladding, ducting for air conditioning and many others, which are of such improved character as to have good heat insulating qualities at little additional cost and without significant addition to bulk.

In one aspect, the invention resides in a method of heat insulating an article against heat from a heat source including the steps of applying, to a surface of the article to be positioned remote from the heat source, superimposed laminations of a metal foil and a film of clear or transparent thermoplastic material such as polythene; and applying to the film heat and pressure to cause it to adhere to the said surface and the foil whilst substantially separating the surface and the foil from direct contact.

The invention in another aspect resides in an article heat-insulated according to this method; and in another aspect it resides in apparatus for carrying the method into effect and including a frame; means for conveying a sheet or panel along the frame; dispensing means on the frame adapted to deliver to a surface of the sheet or panel superimposed laminations of metal foil and clear or transparent thermoplastic film; pressure means for applying pressure to the assembly to compress the thermoplastic laminations between the foil and the sheet or panel; and heating means for applying heat to the assembly to cause the thermoplastic laminations to adhere to both the surface and the foil whilst substantially separating the two from direct contact.

Figure 2:
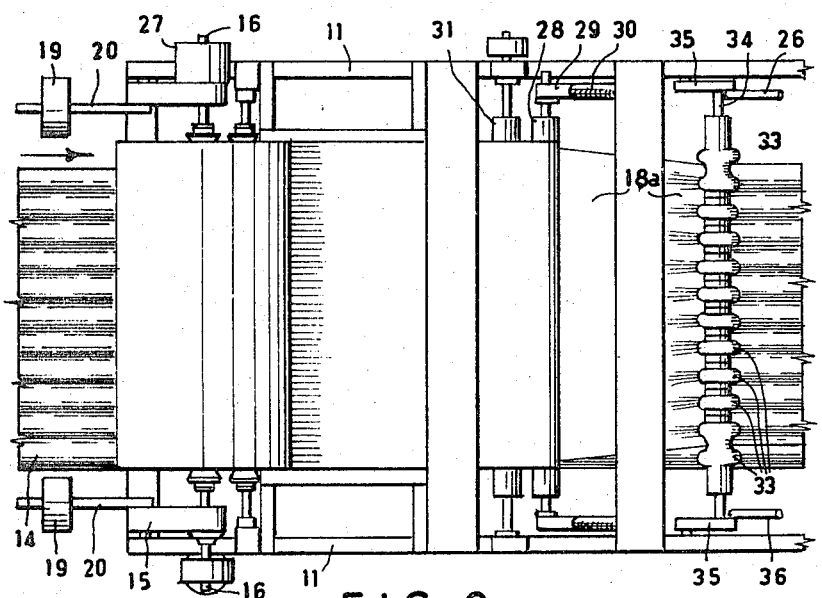
Figure 6:
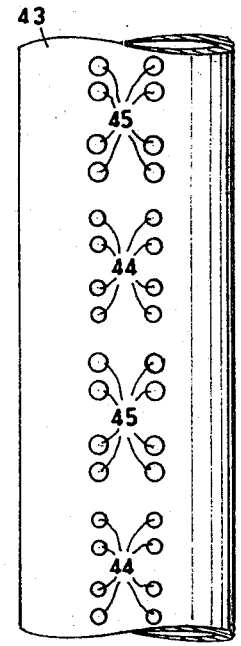
Figure 5:
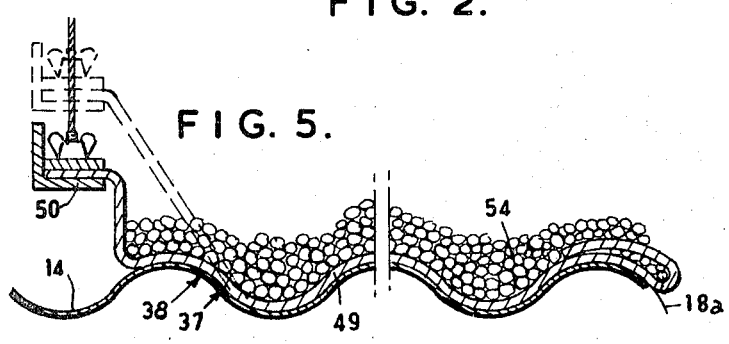
Figure 3:
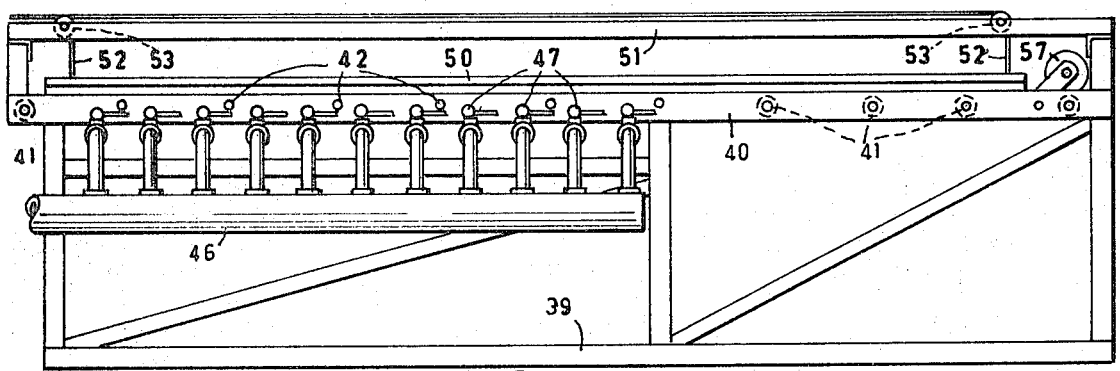
Figure 4:
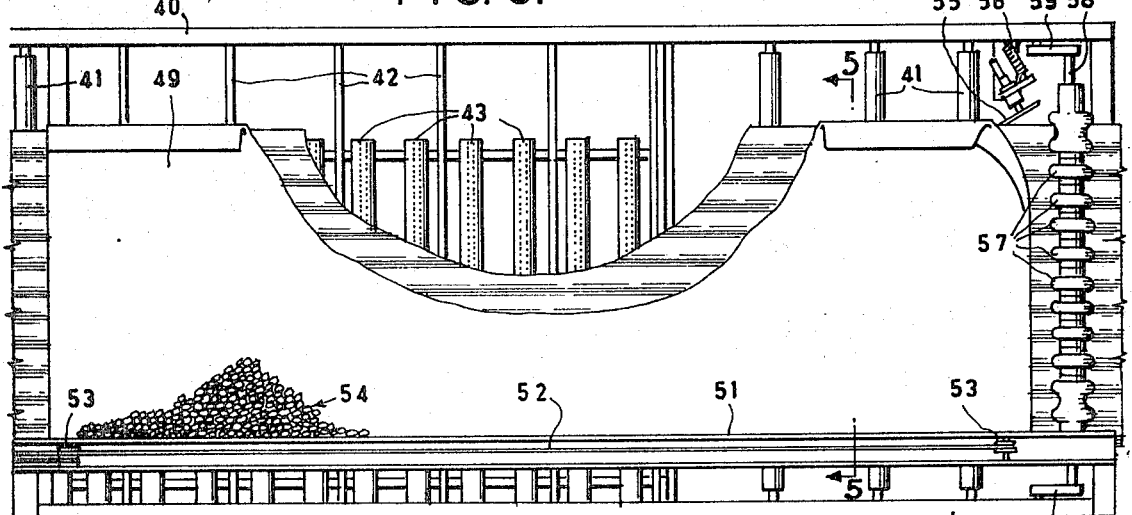
Figure 7:
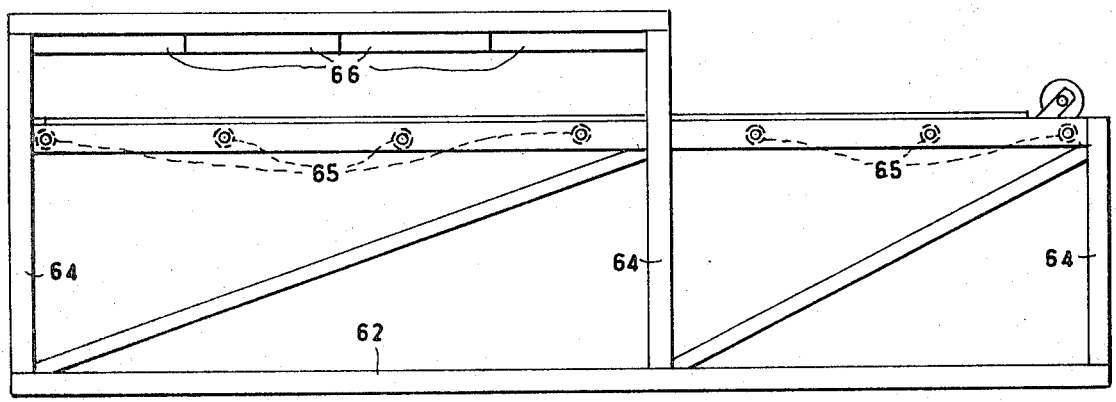

In order that the invention may be readily understood and carried into practical effect, reference is now made to the accompanying drawings, wherein:

FIG. 1 is a side elevation of the dispensing section of apparatus according to the invention, FIG. 2 is a plan view of the apparatus shown in FIG. 1, FIG. 3 is a side elevation of the bonding section of the apparatus, FIG. 4 is a plan view, partly broken-away, of the bonding section shown in FIG. 3, FIG. 5 is a partly broken-away sectional drawing, to enlarged scale, along line 5—5 in FIG. 4, FIG. 6 is a detail drawing shown in plan part of a gas heating element of the bonding section, and FIG. 7 is a side elevation of a bonding section of the apparatus according to an alternative embodiment of the invention.

The dispensing section shown in FIGS. 1 and 2 includes a frame having a base 10 and two side members 11 supported by pairs of standards 12. Transverse rollers 13 between the side members 11 are adapted to support corrugated galvanized steel 14 fed continuously forward, in the direction indicated by an arrow in FIG. 2, from a conventional roll-forming machine (not shown) used in the manufacture of such galvanized sheet steel.

A pair of arms 15 pivoted to the rear standards 12 carry co-axial shafts 16 for a removably mounted roll 17 of thin transparent polythene film, bearing upon a roll 18 of thin aluminum foil similarly mounted between a pair of intermediate standards 12, the pressure applied by the polythene roll 17 to the foil roll 18 being adjustable by means of weights 19 slidable on rods 20 extending from the arms 15.

The polythene and foil rolls 17 and 18 are counter-rotated in the directions indicated by arrows in FIG. 1 so that aluminum foil 18a superimposed on polythene film 17a is drawn forwardly over a splicing table 21 and between a pair of resiliently-surfaced pinch rollers 22 rotatably mounted between a pair of brackets 23, the upper pinch roller being vertically adjustable to vary the pressure on the superimposed foil and film.

Both the polythene roll 17 and the upper pinch roller 22 are adjustably braked frictionally, each having on its shaft at one side a drum 24 engaged by a loop of friction belt 25 supporting weights 26. In addition, an electrically operable brake 27 is associated with the shaft of the polythene roll 17 at the other side, for a purpose hereinafter explained.

From the pinch rollers 22, the superimposed foil and film are carried up and over a tension compensating roller 28, carried by arms 29 pivoted to the front standards 12 and supported by springs 30. The foil and film are then carried down and under a roller 31 between a pair of brackets 32 on the side members 11, and forwardly under a series of co-axial forming rollers 33 mounted adjacently on a shaft 34 carried by a pair of arms 35 pivoted to the side members 11, and which may be raised or lowered by handles 36. The forming rollers are adapted to press the superimposed foil 18a and polythene film 17a into corrugations of the galvanized steel. Before the apparatus is set into operation, the superimposed laminates of foil and polythene film may be guided into the corrugations of the galvanized steel and a number of rods laid over the laminates to press them into the corrugations, before the forming rollers 33 are lowered into operative position. The foil and film, when thus corrugated, do not overlie the corrugated steel from side to side, but, as shown in FIG. 5, at one side the foil 18a protrudes for a short distance beyond the corresponding side of the corrugated steel, the polythene film for a somewhat lesser amount; and at the other side the foil extends to the position indicated at 37, the polythene film extending somewhat further, to the position indicated at 38, so that a narrow side portion of the film beyond the foil is exposed at this side.

From the dispensing section, the corrugated sheet steel with the superimposed foil and film applied thereto is fed forwardly to the bonding section shown generally in FIG. 3 and 4. This has a frame including a base 39 and side members 40 are supported by uprights. The advancing corrugated steel is supported by a series of rollers 41, and also by a series of bearer bars 42, between the side members 40. The steel supported by the bars 42 is heated by a series of gas burners 43, each consisting of a manifold with series of jets 44 and 45, arranged in two parallel rows of corresponding jets, the jets 44 being of lesser diameter than the jets 45 to produce a flame which, viewed from the direction of advance of the steel, has a profile which substantially corresponds to the corrugations of the steel, which thus is substantially uniformly heated.

Each burner 43 receives gas under pressure from a gas pipe 46 through a manually controllable valve 47 and a solenoid valve 48.

The advancing corrugated steel, with the superimposed foil 18a and polythene film 17a, passes under a flexible sheet 49, which may be of glass cloth, and which extends beyond the portion heated by the burners. One side of the flexible sheet 49 is engaged by a clamp bar 50 suspended under a longitudinal channel 51 by cables 52 which pass up into the said channel, over pulley wheels 53, and to any suitable device (not shown) for tensioning the cables to lift the clamp bar 50 and the side of the sheet 49 secured thereto, to the position shown in broken outline in FIG. 5. Normally the clamp bar is lowered, as shown in FIG. 3 and in full outline in FIG. 5, and it extends across the foil and polythene applied to the corrugated steel, and is substantially uniformly weighted by the application of a layer 54 of gravel. Owing to the heat applied to the undersurface of the steel by the burners 43, and the pressure applied by the weighted flexible sheet 49, the polythene film is sufficiently heated by conduction, and pressed sufficiently firmly and for a sufficient period between the galvanized steel and the foil, to adhere to both, so the foil is bonded to the galvanized steel by a thin but substantially uninterrupted lamination of transparent polythene. The narrow side section of the foil depending from one side of the galvanized steel sheet serves to insulate the flexible sheet, at that side, from the effect of the gas burners. To prevent adhesion between the narrow side strip of polythene exposed at the other side and the flexible sheet, this side portion of the flexible sheet is preferably coated with a material with very low coefficient of friction.

As the galvanized steel with the foil bonded thereto is advanced beyond the flexible sheet 49, the narrow side sections of foil and polythene film extending beyond the steel are cut away by an edge cutter wheel 55, driven from a flexible drive and urged into contact with the side edge of the steel by a spring 56.

The galvanized steel, with foil bonded thereto by the polythene film, is passes under a series of pressure rollers 57, generally similar to the forming rollers 33, rotatable on a shaft 58 carried by a pair of arms 59 pivoted to the side members 40. The rollers 57 bear gravitationally into the corrugations and ensure that the bonding is effected thoroughly.

From the bonding section, the finished sheet is carried forward to be cut into appropriate lengths by a guillotine (not shown) of conventional type.

If, during the operation of the apparatus, the roll former is stopped, the electric brake 27, which is connected in the circuit of the roll former, is automatically applied a short time after to stop rotation of the polythene roll 17 and also of the foil roll 18 on which it bears. During the short period the polythene and foil are not being drawn forward by the advancing steel sheet, the roller 28 carried by the spring-loaded arms 29 will be lifted by the springs 30. When the roll former starts again, the brake 27 is automatically released, and the tension re-applied to the polythene and foil, owing to inertia of the rolls 19 and 18, causes the roller 28 to be drawn down to prevent undue stress on the film and foil. As the foil and film are fed in superimposed manner, no additional brake is required for the foil roll 18. Moreover, relatively fragile foil may be controlled and tensioned through the much more resilient polythene on which it is superimposed.

With the stopping of the roll former, the burners 43 are automatically turned down by their solenoid valves 48 which are connected in the roll former circuit; and if the delay is more than a very brief one, the clamp bar 50 is automatically raised to the position shown in broken outline in FIG. 5 to carry the flexible sheet 49 clear of the narrow exposed side portion of polythene film before referred to, to avoid any possibility of the sheet adhering to this exposed and heated section of the film.

Panels of corrugated galvanized steel with heat insulation applied as described will be found to be very satisfactory in use. When used for roofing, they are fixed with the foil lowermost for insulation against solar heat. The clear or transparent polythene is a poor conductor of heat, but is a good medium for the transmission of radiant heat, and so, when the galvanized steel is heated by the sun, heat radiated from its underside passes readily through the polythene layer to the upper surface of the foil which, being a good reflector of heat, causes the radiant heat to be reflected back. Furthermore, the undersurface of the foil will emit little radiant heat. The polythene film may be very thin, and satisfactory results have been achieved with a film of about 0.00075 inch in thickness. The film serves also as an electrolytic barrier between the galvanized steel and the foil, and assists in preventing oxidation of the surface of the galvanized steel near to the foil, which would decrease the insulating qualities of the panel.

In applying laminations of a transparent film and metal foil to articles other than corrugated sheet steel, the apparatus is appropriately modified. Thus, in applying the laminations to corrugated asbestos cement roofing panels, the dispensing section is modified, as shown in broken outline in FIG. 1, by substituting a conveyor 60 of endless-belt type for the rollers 13. The panels may be placed manually or mechanically upon the conveyor, by which they are carried forward, end to end, to have the laminations of polythene and foil applied thereto as before described. Weighted rollers 61 pressing down on the panels assist in ensuring a positive feed by the conveyor. The panels are fed from the dispensing section to a bonding section shown in FIG. 7 which has a main frame including a base 62 above which side members 63 are supported by uprights 64, and the advancing panels are supported by transverse rollers 65 between these side members. The panels pass under a flexible sheet weighted by a layer of gravel as before described, but the means for lifting one side of the sheet may be omitted. Instead of heat being applied from below by gas burners, as before described, the heat is directed downwardly from electric or gas radiant heaters 66 supported above part of the main frame to heat the gravel and sheet weighted thereby, and thus, by conduction, to heat the foil and the film, this heating, with the applied pressure, causing the foil to be bonded to the panels by the polythene film. The panels, after leaving the weighted flexible sheet, are acted on, as before described, by pressure rollers 67 before being conveyed to any suitable apparatus (not shown) for severing the foil and film laminations between succeeding corrugated panels. In this case, the operation of the electrically operated brake 27 is linked to the operation of the conveyor.

With suitable modifications, the apparatus may be used for applying the superimposed foil and clear film to flat sheet galvanized steel or asbestos cement, the shaped forming and pressure rollers then being replaced by plain rollers; or to tiles, the forming and pressure rollers being appropriately modified; and to many other articles.

What we claim is:

1. A method of heat insulating a panel or sheet comprised of superimposed laminates of thermoplastic film material and metal foil bonded to said panel comprising the steps of:
   a. simultaneously applying, to a surface of a moving panel, layers of a metal foil and a film of clear or transparent thermoplastic material, with the film being interposed between said panel and said foil so as to maintain said foil continuously out of contact with said panel,
   b. positioning a flexible sheet over the entire exposed surface of said foil on said moving panel, said sheet being longitudinally non-movable and assuming the surface configuration of said moving panel and layers.
   c. applying a continuous mass of deformable weight on the surface of said flexible sheet contacting said sheet against said foil thereby firmly pressing the entire surface of said foil and film layers against said panel, and
   d. heating said moving laminated panel to cause said thermoplastic film to adhere both to said foil and to said surface of said panel during the weight applying step thereby firmly bonding said foil to said panel.

2. The method of claim 1 wherein said panel or sheet is of galvanized sheet steel and said thermoplastic film comprises polythene approximately .00075 inches in thickness.

3. The method of claim 1 further including the step of applying said layers of metal foil and thermoplastic film material on said panel in a transversely offset manner so that said foil at one side of said panel serves to insulate said flexible sheet from the effect of said heating means, with both said foil and said film having exposed marginal portions at said one side which extend laterally beyond the edge of the panel, said thermoplastic film at the opposite side of said panel extending laterally beyond said foil, said film serving to space said foil from said associated surface of said panel throughout the width of said foil.

4. The method of claim 3 further including the step of cutting the exposed side marginal portions of said foil and said film downstream of said heating means.

5. The method of claim 4 further including the step of passing said heated panel with said foil firmly bonded thereto under a series of pressure rollers for augmenting the bonding of sad foil to said panel.

* * * * *

UNITED STATES PATENT OFFICE
CERTIFICATE OF CORRECTION

Patent No. 3,720,558               Dated March 13, 1974

Inventor(s) JOHN IAN MENZIES and MAUREEN MENZIES

It is certified that error appears in the above-identified patent and that said Letters Patent are hereby corrected as shown below:

In the heading of the patent, between the headings [21] and [52], the following information concerning the foreign application priority data should be inserted:

[30]  Foreign Application Priority Data

| June 17, 1968 | Australia | 39,284/68 |
| July 16, 1968 | Australia | 40,707/68 |
| Aug. 6, 1968  | Australia | 41,754/68 |

Signed and sealed this 6th day of August 1974.

(SEAL)
Attest:

McCOY M. GIBSON, JR.              C. MARSHALL DANN
Attesting Officer                 Commissioner of Patents

FORM PO-1050 (10-69)